Sept. 21, 1971     T. A. MIDDLESWORTH     3,606,748
BALANCED CUTTING ASSEMBLY FOR A MOWER
Filed Sept. 8, 1969     2 Sheets-Sheet 1
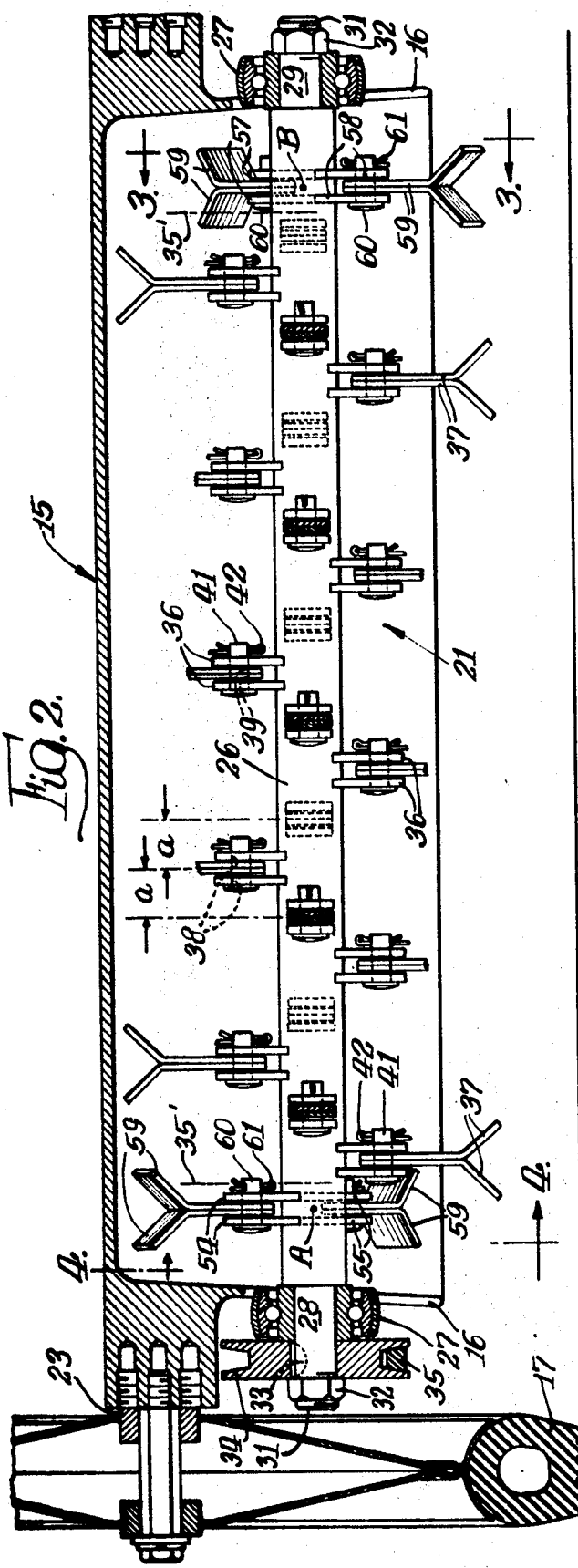
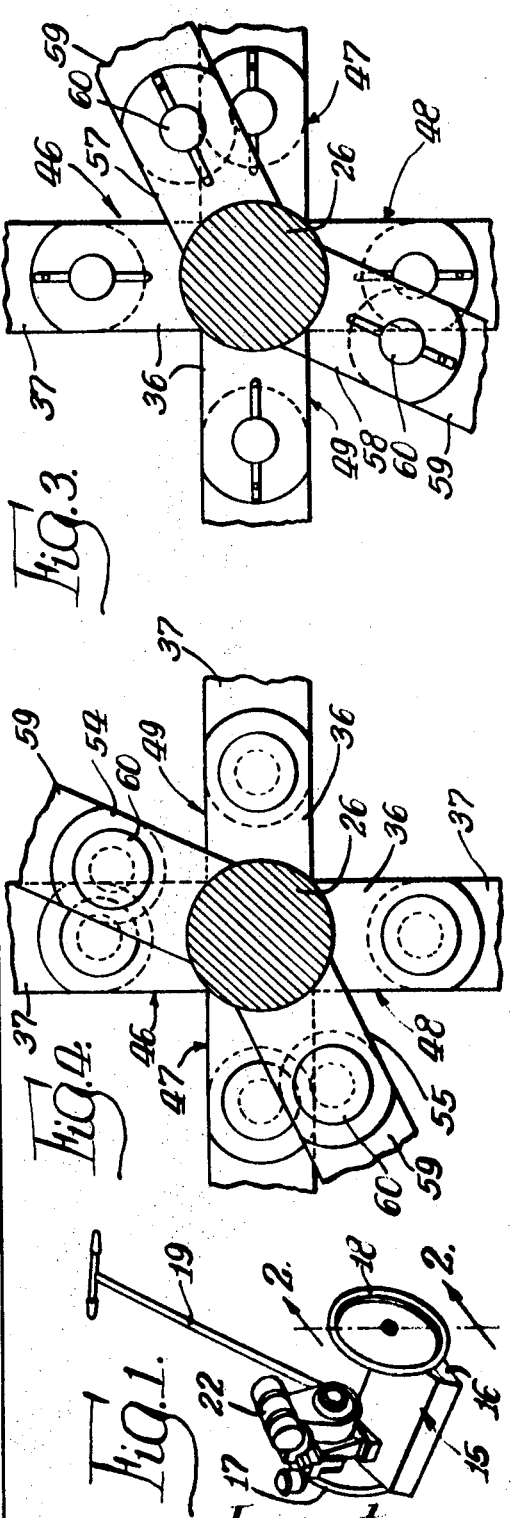
Inventor:
Tommy A. Middlesworth,
By
Hibben, Noyes & Bicknell
Attys.

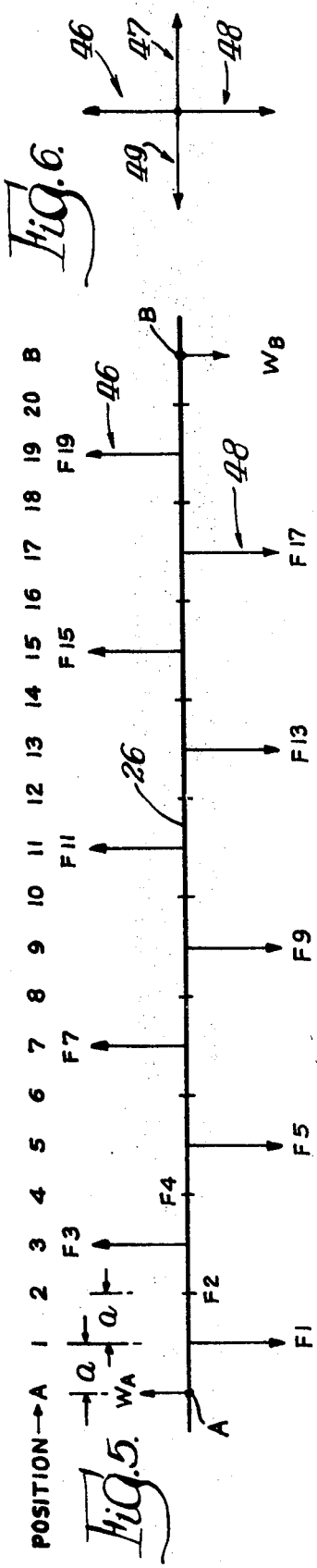

United States Patent Office 3,606,748
Patented Sept. 21, 1971

3,606,748
BALANCED CUTTING ASSEMBLY FOR A MOWER
Tommy A. Middlesworth, Hinsdale, Ill., assignor to
Mott Corporation, La Grange, Ill.
Filed Sept. 8, 1969, Ser. No. 855,938
Int. Cl. A01d 55/22
U.S. Cl. 56—294
14 Claims

ABSTRACT OF THE DISCLOSURE

This disclosure deals with a statically and dynamically balanced cutting assembly for use in a mower. The assembly includes a rotatable shaft, a plurality of radially extending cutting blade supports secured to said shaft, and one or more cutting blades attached to each of said supports. The supports are angularly and circumferentially spaced in a predetermined pattern along a central section of the shaft so that, upon rotation of the shaft, the blades cut a swath which is substantially continuous over the length of the central section. To balance the assembly, there is secured to each end section of the shaft at least one balance blade support, and one or more balance blades are fastened to each balance blade support. The balance blades and supports therefor are substantially identical with the first mentioned supports and blades, and they are axially and angularly located relative to the pattern such that they statically and dynamically balance the assembly.

---

A mower of the character disclosed, for example, in C. W. Mott Pat. No. 2,871,644 includes a rotatably mounted shaft, an engine for rotating the shaft at high speeds, a plurality of blade supports located at axially and circumferentially spaced locations on the shaft, and at least one cutting blade pivotally connected to each support. The supports are spaced on the shaft to form a spiral pattern and are sufficiently close that, upon rotation of the shaft, the blades cut a substantially continuous swath over nearly the entire length of the shaft.

Since the shaft is rotated at relatively high speeds, the assembly including the shaft, blade supports and blades should of course be statically and dynamically balanced. While it is fairly easy to statically balance such an assembly by placing an equal number of blade supports and blades on each of the shaft, it is more difficult to dynamically balance the assembly because the blade supports and blades on one side of the shaft are a greater distance from a given balance point than the blade supports and blades on the diametrically opposed side.

In the past, assemblies of this character have been statically and dynamically balanced by fastening weights to the opposite end portions of the shaft, the amounts of the weights being determined by the weights of the blade supports and the blades. This method of balancing is disadvantageous because a change is sometimes made from one size blade to another. For example, a change may be made to a relatively wide and heavy blade when coarse weeds are to be cut or a change may be made from a pair of bent blades to a single straight blade at each location when renovating a lawn. If the weights are fixed, such a change in the blades will of course result in unbalance of the shaft. However, where the weights are made up of replaceable parts to accommodate a change in blade size, the repairman frequently neglects to replace the weights, and quite frequently, the weights are lost altogether.

In accordance with the present invention, the foregoing disadvantages are eliminated by discarding the weights heretofore used and by adding additional blades and supports, and, consequently, a change in blade size automatically results in proper balancing. A statically and dynamically balanced cutting assembly in accordance with the present invention comprises a rotatable shaft, a plurality of radially extending blade supports secured to the central section of said shaft at axially and circumferentially spaced locations, at least one cutting blade means fastened to each of said supports, and at least one balance blade support and balance blade means preferably at the end sections of said shaft, said balance blade support and said balance blade means being substantially identical with said first mentioned blade supports and blade means, but being located to produce a statically and dynamically balanced assembly.

Objects and advantages of the invention will become apparent from the following detailed description taken in conjunction with the accompanying figures of the drawings, wherein:

FIG. 1 is a perspective view of a mower including a cutting assembly embodying the invention;

FIG. 2 is an enlarged fragmentary sectional view taken on the line 2—2 of FIG. 1;

FIG. 3 is a sectional view taken on the line 3—3 of FIG. 2;

FIG. 4 is a sectional view taken on the line 4—4 of FIG. 2;

FIGS. 5 to 8 are diagrams illustrating the construction of the cutting assembly shown in FIGS. 2 to 4;

FIGS. 9 and 10 are diagrams illustrating an alternate form of cutting assembly; and FIGS. 11 and 12 are diagrams similar to those of FIGS. 9 and 10 but illustrating still another form of cutting assembly.

With particular reference to FIGS. 1 and 2, a mower including a cutting assembly embodying the invention comprises a hood-like frame 15 having an open bottom and side sections 16, a pair of wheels 17 and 18 rotatably fastened to the side sections 16 and supporting the frame 15 on the ground, a handle 19 fastened to the frame 15 whereby an operator of the mower may move the mower in a desired direction, a cutting assembly 21 located within the hood of the frame 15 and rotatably supported on the sections 16, and a drive engine 22 mounted on top of the frame 15 for rotating the cutting assembly 21 at a relatively high rate of speed.

With particular reference to FIG. 2, the frame 15 preferably consists of a single piece, relatively heavy casting which will protect an operator of the mower from debris. The wheels 17 and 18 are rotatably fastened to the side sections 16 of the frame 15 by bearing assemblies 23 which are conventional in nature and form no part of the present invention. The cutting assembly 21 comprises, in part, a shaft 26 which is rotatably mounted at its ends on the side sections 16 of the frame 15. In the present construction, a bearing assembly 27 is provided at each end of the shaft 26 to rotatably support the shaft 26. Again, the bearing assemblies 27 are conventional in nature and form no part of the present invention. The shaft 26 of the cutting assembly 21 is preferably an elongated solid metal shaft having reduced diameter end portions 28 and 29 which are mounted in the bearing assemblies 27. Both end portions 28 and 29 include threads 31 for attachment of nuts 32 for the purpose of securing the shaft 26 in the bearings. In addition, the end portion 28 of the shaft 26 includes a keyway 33 for securing the shaft 26 to a drive pulley 34 and belt 35 employed to connect the shaft 26 to the engine 22.

Between the two end portions 28 and 29 of the shaft 26 is provided a plurality of main blade supports, each of the main blade supports comprising, in the present instance, a pair of radially extending ears 36. The main blade supports are axially and circumferentially spaced and are located on a central section of the shaft 26, this central section being approximately the portion of the shaft 26 extending between the two lines 35' shown in FIG. 2. As shown in FIG. 2, the spacing between the two ears 36 of each pair is slightly greater than the total thickness of two cutting blades 37 so that two blades may be positioned between the ears 36 of each pair. The blades 37 may be substantially the same shape as the blades shown in the prior Mott Pat. No. 2,871,644. To pivotally connect the blades 37 to a pair of ears 36, aligned holes 38 are formed in and adjacent the outer ends of the ears 36 and aligned holes 39 are formed at the inner end portions of the blades 37, and a pin 41 extends through the holes 38 and 39. A cotter pin 42 at the outer end of each pin 41 may be provided to hold each pin 41 in assembled relation with the blades 37 and the ears 36.

With particular reference to FIGS. 3 and 4, the ears 36 on the central section of the shaft may be arranged in four axially extending rows 46, 47, 48 and 49, and adjacent rows 46 to 49 are spaced apart by an angle of 90°. With reference to FIG. 2, each pair of ears 36 is axially offset from the ears 36 of adjacent rows to form a spiral pattern around the shaft. Looking at the shaft 26 from its right hand end as seen in FIG. 3, for example, the nearest ears 36 in the row 47 extend toward the right, the next adjacent ears 36 in the row 48 extend downwardly, the next adjacent ears in the row 49 extend toward the left, etc., thus spiraling in the counterclockwise direction toward the far end of the shaft. The distance between the center lines of adjacent pairs of ears is indicated by the letter $a$, the distance $a$ being substantially constant throughout the central section of the shaft. The distance $a$ is sufficiently small compared to the axial span of the blades 37 to cut a continuous swath of grass as the shaft 26 is rotated and the mower is moved across the ground.

There are an equal number, in the present instance five, of ears 36 in each of the four rows 46 to 49, and since the four rows are equally spaced around the shaft 26, the portion of the assembly including the shaft 26, the ears 36 and the blades 37 in the central portion of the shaft will be in static balance when supported on a generally horizontal axis. However, this portion of the assembly will not be in dynamic balance because of the spiral pattern formed by the spacing of the ears 36. For dynamic balance, the sum of all of the external moments at any point, such as point A or point B (FIG. 2), along the axis of the shaft must be equal to zero when the shaft is rotating. In the present construction, the points A and B lie on the axis of the shaft 26 and are spaced the distance $a$ from the centerlines of the nearest pair of ears 36. It will be apparent that the pair of ears at the far end of the row 48 from the point B, for example, will have a greater moment than the next adjacent pair of ears due to the spiral pattern, thus producing dynamic unbalance.

To place the entire assembly in dynamic balance while maintaining it in static balance, two pair of balance ears 54 and 55 are attached to the end of the shaft which is adjacent the point A, and two pairs of balance ears 57 and 58 are provided at the end of the shaft 26 which is adjacent the point B. The ears 54, 55, 57 and 58 are identical with the ears 36, and balance blades 59 which are identical with the blades 37 are attached to the balance ears by pins 60 and 61 which are preferably identical with the pins 41 and 42. The four balance ears 54, 55, 57 and 58 are axially and angularly located relative to the ears 36 of the four rows 46 to 49 to place the entire cutting assembly in dynamic as well as static balance.

FIGS. 5 to 8 are diagrams illustrating the shaft 26 and the forces acting on it during rotation. These figures illustrate a construction wherein there are four equally spaced rows, as shown in FIGS. 2 to 4, and wherein there are 5 pairs of ears 36 in each row and one or more blades attached to each pair of ears. The centerlines of adjacent pairs of ears are separated by a uniform space $a$, and the points A and B are separated from the centerlines of the most closely adjacent pair of ears by the same distance $a$.

When the shaft 26 rotates, the force F exerted on the shaft by the combination of each pair of ears 36, the associated cutting blades or blades 37, and the connecting pins is given by the equation $$F = m(co)^2 r \tag{1}$$

where $m$ is the total mass of each pair of ears, the associated blade or blades, and the pins 41 and 42, $co$ is the speed of rotation of the shaft, and $r$ is the distance from the center of the mass to the axis of rotation. In FIG. 5, the notation $F_1$ indicates the above force on the shaft 26, caused by the set of ears 36, blades and pins at the left end, as seen in FIGS. 2 and 5, upon rotation of the shaft, the notation $F_2$ indicates the corresponding force at the next adjacent set of ears, etc., the notation $F_3$ indicates the corresponding force of the next adjacent set of ears, etc. The notation $W_A$ indicates a balance weight at the point A in the same direction as the row 46, and the notation $W_B$ indicates a balance weight at the point B in the same direction as the row 48.

Regarding static balance, considering only the ears, blades and pins in the two rows 46 and 48 and the balance weights $W_A$ and $W_B$ when the row 46 is directed upwardly and the row 48 is directed downwardly, to be in static balance, the tendency to turn the shaft of the weight of any row of ears, blades and pins with the balance weight extending in the direction of that row, must equal the tendency of all other weights of the other row with its balance weight. In other words, $$F_1 + F_5 + F_9 + F_{13} + F_{17} + W_B = W_A + F_3 + F_7 + F_{11} + F_{15} + F_{19} \tag{2}$$

Assuming that all of the ears 36, blades 37 and the pins are identical, it follows that $$5F + W_B = W_A + 5F \tag{3}$$

or $$W_A = W_B \tag{4}$$

Thus, the total balance weights must be the same for static balance at positions A and B, and this will be true regardless of the rotative position to which the cutting assembly is turned.

Regarding dynamic balance, as previously mentioned, to be in dynamic balance, the sum of all of the external moments at any point must be equal to zero. With reference to FIG. 5, the sum of the moments about point B in the counterclockwise direction is $$(20a)F_1 + (16a)F_5 + (12a)F_9 + (8a)F_{13} + (4a)F_{17}$$

or $$(60a)F \tag{5}$$

The sum of the moments in the clockwise direction are $$(21a)W_A + (18a)F_3 + (14a)F_7 + (10a)F_{11} + (6a)F_{15} + (2a)F_{19}$$

or $$(21a)W_A + (50a)F \tag{6}$$

Since the sum of all of the above moments must be equal to zero for dynamic balance, $$(60a)F = (21a)W_A + (50a)F \tag{7}$$

or $$W_A = \frac{10}{21}F \tag{8}$$

Since $W_A = W_B$ from Equation 4 the above Equation 8 gives the balance force required in the plane of the rows 46 and 48 at both point A and B to dynamically balance the two rows 46 and 48. From FIG. 5 it will be noted that both $W_A$ and $W_B$ extend in opposite directions to the nearest forces $F_1$ and $F_{10}$, respectively. Consequently, $W_A$ and $W_B$ also extend in opposite directions to each other, and thus maintain this portion of the assembly in static balance.

Considering the shaft 26 to have been turned through an angle of 90°, it can be shown by the same procedure that the balance forces at the points A and B required to balance the two rows 47 and 49 is also 10F/21. These two forces are in the plane of rows 47 and 49 and are directed in opposite directions to each other and to the most closely adjacent forces $F_2$ and $F_{20}$ in the rows 47 and 49.

FIG. 7 is a vector diagram showing the two balance forces $W_A$ at the point A when the row 46 is extending upwardly. It will be noted that the two balance forces are equal and are at 90° from each other, and therefore a resultant balance force $R_A$ which is the equivalent of the two balance forces $W_A$ would form an angle of 45° with either of the forces $W_A$. By vector analysis, it can be shown that the amount of the force $R_A$ may be derived as follows $$R_A = \frac{W_A}{\sin 45°} = \frac{10}{21} F \left(\frac{1}{\sin 45°}\right) = \frac{10}{21} F (1.4142) = .6734F \quad (9)$$

While a force in the direction of $R_A$ having a value of .6734F at the point A would be necessary for balancing the shaft, it is far more advantageous, for the reasons previously mentioned, to provide one or more balance forces, each of which is exactly equal in magnitude to the amount of force F due to a pair of ears 36 and the associated blades and pins. This is accomplished by providing the two pairs of balance ears 54 and 55 and associated blades and pins, and locating the pairs of balance ears 54 and 55 to make their combined force equal to the resultant force $R_A$. With reference to FIG. 8, the notation $R_A$ again indicates the resultant force shown in FIG. 7, and the numeral 63 indicates a base line which is particular to the force line $R_A$. Since two pair of ears and associated blades and pins are to be provided at the point A, the total resultant force $R_A$ is divided in half to produce a force $R_{A/2}$ in the same direction as the force $R_A$. The two desired forces F are laid out at angles $\theta$ to the base line 63, the angle $\theta$ being chosen such that the component in the direction of $R_A$ of each force F is equal to $R_{A/2}$. The components in the direction of the base line 63 of the two forces F are equal and in the opposite directions and therefore they cancel each other. Thus, only the two forces each having a value $R_{A/2}$ remain and their sum is equal to the resultant force $R_A$.

To determine the angle $\theta$ required to attain the foregoing result, the following equations are applied $$R_{A/2} = F \sin \theta \quad (10)$$

or $$R_A = 2F \sin \quad (11)$$

Combining Equations 9 and 11, $$.6734F = 2F \sin \theta$$

$$.3367 = \sin \theta$$

$$\theta = 19°40'37'' \quad (12)$$

As mentioned above, the angle $\theta$ is measured from the base line 63 which lies midway between the rows 46 and 47.

Thus, for a cutting assembly as shown in FIG. 2 including four rows of ears, blades and pins, and a total of twenty-one spaces $a$ between the points A and B, the assembly will require at the point A the two pair of ears 54 and 55 at an angle of 19°40'37" from the base line 61. The line 61 is displaced 45° in the clockwise direction, as seen in FIG. 4, from a vertical line passing through the center line of the shaft 26.

As previously mentioned, $W_B$ is equal to but directed oppositely from $W_A$. Thus, as shown in FIG. 3, the two pair of balance ears 57 and 58 are at an angle of 19°40'37" from a base line which is displaced 45° in the clockwise direction, as seen in FIG. 3, from a vertical line passing through the centerline of the shaft.

A more general equation for $W_A$ (and $W_B$) for a shaft having four equally spaced rows of ears, blades and pins is $$W_A = \frac{\frac{1}{2}(N-1)}{N} F \quad (13)$$

where N equals the number of spaces $a$ between the points A and B. In Equation 8, N equals twenty-one. It should be understood that for Equation 13 to apply, each row must have the same number of ears, blades and pins, and each pair of balance ears, blades, and pins must lie in the same radial plane. A general equation for the angle $\theta$ for the construction described above is $$\theta = \sin^{-1} .353553 \left(1 - \frac{1}{N}\right) \quad (14)$$

It will be apparent that the foregoing analysis may be applied to other cutting assemblies wherein more or less than four rows of ears and associated blades and pins are provided. FIGS. 9 and 10 are diagrams illustrating a construction wherein two diametrically opposed rows 64 and 65 of ears, blades and pins are provided, and general expressions for the weights and angles are $$W_A = W_B = \frac{1}{2} \left(1 - \frac{1}{N}\right) F \quad (15)$$

$$\theta = \sin^{-1} .250 \left(1 - \frac{1}{N}\right) \quad (16)$$

The angle $\theta$ is measured from a base line 67 which is midway between the two rows 64 and 65.

For a construction shown in FIGS. 11 and 12 wherein three equally spaced rows 68, 69 and 70 of ears, blades and pins are provided, the following equations apply $$W_A = W_B = .57735 \left(1 - \frac{1}{N}\right) F \quad (17)$$

$$\theta = \sin^{-1} .288675 \left(1 - \frac{1}{N}\right) \quad (18)$$

The angle $\theta$ is measured from a base line 71 which is aligned with the row 69 and is therefore midway between the two rows 68 and 70.

Similar equations may also be developed for still other assemblies having more than four rows, or for other assemblies wherein the two sets of balance ears, blades and pins at each end of the shaft do not lie in the same radial plane with each other. In some constructions, the angle $\theta$ may be equal or close to zero or it may be such as to place a pair of balance ears in line with the ears of one of the rows. In some constructions, for example in an assembly including six rows of ears, etc., only one set of balance ears, blades and pins may be required at each end of the shaft. While it is preferable that the balance ears, etc., be located at the two ends of the shaft, it may be possible in some constructions to locate the balance ears, etc., at another position between the ends of the shaft. The location at the end portions of the shaft is preferable however because it results in uniform cutting over the length of the shaft. While the invention has been shown and described in connection with blade supports including pairs of ears and pins, and a pair of blades at each support, it should be understood that the invention is equally applicable to assemblies including other types of blade supports and blades.

From the foregoing, it will be apparent that a novel and useful statically and dynamically balanced cutting assembly has been provided. The assembly is especially advantageous in that the balancing forces are provided by blade support ears and cutting blades which are identical with the other blade support ears and cutting blades of the assembly. Consequently, when a repairman changes blades, he simply replaces all of the blades of the assembly including the balancing blades, and the assembly will still be both dynamically and statically balanced.

I claim:
1. A statically and dynamically balanced cutting assembly for use in a mower, said assembly comprising a rotatable shaft, a plurality of radially extending cutting blade means attached to said shaft, said blade means being axially and circumferentially spaced on said shaft in a predetermined pattern to effect cutting of a substantially continuous swath as said shaft is rotated, and at least one radially extending balancing blade means attached to said shaft, said balancing blade means being substantially identical with said first mentioned blade means and being axially and angularly located relative to said pattern to place said assembly in both static and dynamic balance.

2. An assembly according to claim 1, wherein at least one of said balancing blade means is attached to said shaft adjacent each end thereof.

3. An assembly according to claim 1, wherein a pair of balancing blade means are attached to said shaft adjacent each end thereof.

4. An assembly according to claim 3, wherein the balancing blade means of each of said pairs are located in angularly spaced relation and are in substantially the same radial plane.

5. An assembly according to claim 1, wherein said pattern comprises a spiral formed by at least two axially extending rows of said cutting blade means, said blade means of adjacent rows being axially spaced to form said spiral, and said balancing blade means are located at a predetermined angle to said rows.

6. An assembly according to claim 2, wherein said balancing blade means at one end of said shaft is directed oppositely to said balancing blade means at the other end of said shaft.

7. A statically and dynamically balanced cutting assembly for use in a mower, said assembly comprising an elongated rotatable shaft, a plurality of radially extending blade supports secured to said shaft at axially and circumferentially spaced locations, said supports being arranged in at least two rows extending generally lengthwise of the shaft, there being an equal number of said supports in each of said rows and said supports being substantially equally spaced on said shaft to form a spiral configuration, cutting blade means connected to each of said supports, and balancing means connected to said shaft at each end thereof, each of said balancing means comprising a pair of balancing blade supports and balancing cutting blade means for each of said balancing blade supports which are substantially identical with said first mentioned blade supports and said cutting blade means, wherein each of said pairs of balancing blade supports and balancing cutting blade means is at a predetermined angle relative to said rows, said angle being dependent on the number of said rows and on the number of supports and blade means in each of said rows.

8. A cutting assembly according to claim 7, wherein said angle is designated $\theta$ and may be determined from the equation $$\theta = \sin^{-1} .353553\left(1 - \frac{1}{N}\right)$$

where the number of said rows is four and N is equal to the number of axial spaces between said blade supports and said balancing means, and the angle $\theta$ is measured from a base line which has a predetermined angular location relative to said rows.

9. A cutting assembly according to claim 8, wherein said base line is angularly located midway between two of said rows.

10. A cutting assembly according to claim 7, wherein said angle is designated $\theta$ and may be determined from the equation $$\theta = \sin^{-1} .288675\left(1 - \frac{1}{N}\right)$$

where the number of said rows is three and N is equal to the number of axial spaces between said blade supports and said balancing means, and the angle $\theta$ is measured from a base line which has a predetermined angular location relative to said rows.

11. A cutting assembly according to claim 10, wherein said base line is angularly located midway between two of said rows.

12. A cutting assembly according to claim 7, wherein said angle is designated $\theta$ and may be determined from the equation $$\theta = \sin^{-1} .250\left(1 - \frac{1}{N}\right)$$

where the number of said rows is two and N is equal to the number of axial spaces between said blade supports and said balancing means, and the angle $\theta$ is measured from a base line which has a predetermined angular location relative to said rows.

13. A cutting assembly according to claim 12, wherein said base line is angularly located midway between said two rows.

14. A statically and dynamically balanced cutting assembly for use in a mower, said assembly comprising a rotatable shaft, a plurality of radially extending cutting blade means attached to said shaft, said blade means being arranged in at least two rows extending generally lengthwise of the shaft, and at least one radially extending balance cutting blade means attached to each end portion of said shaft, said balance blade means being substantially identical with said first mentioned cutting blade means and being located at a predetermined angle relative to a certain one of said rows.

References Cited
UNITED STATES PATENTS

| | | | |
|---|---|---|---|
| 2,871,644 | 2/1959 | Mott | 56—26 |
| 2,990,667 | 7/1961 | Schwalm | 56—294 |
| 3,050,927 | 8/1962 | Markham et al. | 56—504 |
| 3,309,854 | 3/1967 | Mitchell et al. | 56—504 |
| 3,373,548 | 3/1968 | Myers et al. | 56—294 |

RUSSELL R. KINSEY, Primary Examiner

U.S. Cl. X.R.

56—26